United States Patent

Lynch et al.

[15] 3,681,436

[45] Aug. 1, 1972

[54] 1-(PARAOXYBENZYL)-INDANES

[72] Inventors: Don Murl Lynch, Waukegan; John Wayne Cole, Deerfield, both of Ill.

[73] Assignee: Abbott Laboratories, North Chicago, Ill.

[22] Filed: Aug. 20, 1970

[21] Appl. No.: 65,657

Related U.S. Application Data

[63] Continuation-in-part of Ser. No. 604,126, Dec. 26, 1966, abandoned, which is a continuation-in-part of Ser. No. 583,250, March 10, 1966, abandoned.

[52] U.S. Cl.........260/479 R, 260/612 R, 260/613 R, 260/619 F, 424/311, 424/341, 424/346
[51] Int. Cl. ....C07c 69/16, C07c 43/22, C07c 39/12
[58] Field of Search.260/479 R, 612 R, 613 R, 619 F

[56] References Cited

UNITED STATES PATENTS 2,979,534  4/1961  Petropoulos et al..........260/619

OTHER PUBLICATIONS

Solmssen Chem. Reviews Vol. 37 (1945), pages 566–567.
Lynch et al., J. Med. Chem., Vol. 11 (1968). pages 291–295.

*Primary Examiner*—James A. Patten
*Attorney*—Robert L. Niblack

[57] ABSTRACT

The present invention is directed to 1-(4-substituted benzyl)indans and simple analogs thereof; they have been found to inhibit the metabolic function of reproductive organs when administered to female, warm-blooded animals in very small doses.

7 Claims, No Drawings

1-(PARAOXYBENZYL)-INDANES

RELATIONSHIP TO OTHER APPLICATIONS

This application is a continuation-in-part of our previous application, Ser. No. 604,126, filed Dec. 26, 1966, which is a continuation-in-part of Ser. No. 583,250 of Mar. 10, 1966, both now abandoned.

DETAILED DESCRIPTION OF THE INVENTION

The present invention is directed to 1-(p-substituted benzyl)indan derivatives of the formula

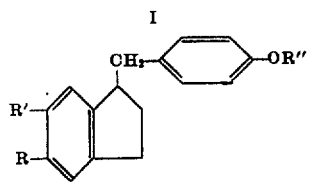

and

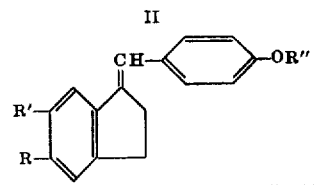

wherein R is OH, methoxy or acetoxy, R' is H or R and R" is H, methyl or acetyl.

The new compounds exhibit steroid-like activity; they inhibit the metabolic function of reproductive organs in female, warm-blooded animals and thus are useful to control the reproduction of mammals. They may be administered intramuscularly in dosages of from 0.1 to 2.5 mg./kg. as aqueous suspension or as vegetable oil solutions or they are administered orally in dosages of from between 0.1 to 4 mg./kg.

The new compounds are prepared by condensing the ketone of formula

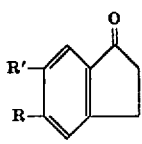

wherein R is methoxy and R' is H or R with a p-substituted benzyl Grignard reagent of the formula

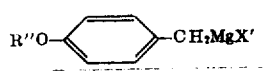

wherein X' is a halogen and wherein R" is methyl or benzyl in the presence of an anhydrous, inert, organic solvent at a temperature between 0° and 100° C. under anhydrous conditions for a period of at least 15 minutes. The reaction medium is an anhydrous solvent used routinely in Grignard reactions e.g., diethyl ether, diisopropyl ether, benzene, toluene, tetrahydrofuran, etc. The expression "inert" is used above and herein below to indicate that the solvent does not interfere with the reaction and does not react with any of the starting materials or the end product formed.

In a specific embodiment of the present invention, the reaction leading to the new products is carried out in a nitrogen atmosphere and preferably, the above-named ketone is added slowly to the Grignard solution, followed by refluxing for a period of between 15 minutes and several hours. The reaction mixture is cooled and the liquid phase is poured into ice water to decompose the Grignard complex. The magnesium hydroxide so formed may be solubilized by use of ammonium salts and/or hydrochloric acid to permit easier separation of the phases. The desired product is then isolated from the organic phase. The benzylidene compounds of formula II so obtained may be hydrogenated catalytically to the corresponding benzyl compounds of formula I, using palladium as the catalyst. The methoxy groups present in the A-ring may be cleaved to produce the corresponding hydroxy derivatives. Alternately, the methoxy group or groups can first be cleaved and the corresponding hydroxy compounds can then be hydrogenated to the corresponding saturated B-ring compound. The hydroxy group or groups may be esterified by standard methods with acetyl chloride or acetic anhydride.

To illustrate the preparation of the new compounds reference is made to the following examples which are not intended to limit the invention in any respect.

EXAMPLE 1

1-(p-Methoxybenzylidene)-5-methoxyindan

A solution of 29.1 g. of anisyl chloride (b.p. 96.5°–98° C. 5.8–5.9 mm.) in 110 ml. of dry ether is added in a nitrogen atmosphere to a mixture of 200 ml. of dry ether, 17 g. of magnesium turnings and 17 g. of 40-mesh magnesium powder over a period of 3 hours and 40 minutes. The mixture is stirred rapidly during the addition.

A solution of 9.2 g. of 5-methoxy-1-indanone in 120 ml. of dry benzene is added to the above mixture over a period of 5 minutes. An additional 130 ml. of benzene is added and the mixture is stirred under reflux in a nitrogen atmosphere for 3 hours. After cooling the mixture to room temperature, the liquid phase is decanted into a mixture of ice and 720 ml. of 10 percent aqueous ammonium chloride. The organic layer is separated, washed with water and dried over magnesium sulfate. The solvent is removed under reduced pressure to leave 26.4 g. of a residue which is crystallized from benzene to give 14 g. of white crystals melting at 134°–8 C. (clear melt at 150° C.) identified as "title."

EXAMPLE 2

1-(p-Hydroxybenzylidene)-5-Hydroxyindan

A mixture of 1 g. of 1-(p-methoxybenzylidene)-5-methoxyindan and 3.23 g. of pyridine hydrochloride is heated at 205°–210° C. with stirring under nitrogen for 50 minutes, cooled in an ice bath, and diluted with 25 ml. of water. The mixture is then made alkaline with a 5 percent aqueous sodium hydroxide solution and extracted with ether. The alkaline aqueous phase is acidified with 5 percent aqueous hydrochloric acid and extracted with ether. The ether extraction is washed with water, dried and the solvent is evaporated leaving 0.69 g. of 1-(p-hydroxybenzylidene)-5-hydroxyindan.

Crystallization of the crude material from ethyl acetate produces the pure 1-(p-hydroxybenzylidene)-5-hydroxyindan, melting at 224° C. (dec.)

EXAMPLE 3

1-(p-Acetoxybenzylidene)-5-Acetoxyindan

To a solution of 1.55 g. of the compound of Example 2 dissolved in 21 ml. of pyridine is added dropwise 5 ml. of acetic anhydride and the mixture is swirled for 10 minutes at room temperature and allowed to stand overnight. The mixture is diluted dropwise with 6 ml. of water while swirling over a 15-minute period with slight cooling. Further dilution produces an oil which is extracted with ether. The ether extract is washed in turn with 5 percent aqueous hydrochloric acid, water, 5 percent aqueous sodium carbonate and water. The organic phase is dried over magnesium sulfate and the solvent is removed under reduced pressure to leave 2.0 g. of a colorless oil which slowly crystallizes on standing. Crystallization from benzene/hexane gives 1.5g. of 1-(p-acetoxybenzylidene)-5-acetoxyindan melting at 168° C. (cloudy at 158°–61°C.)

EXAMPLE 4

1-(p-Methoxybenzylidene)-5,6-Dimethoxyindan

By repeating the procedure of Example 1, using 5,6-dimethoxy-1-indanone and anisyl Grignard as the starting material, 1-(p-methoxybenzylidene)-5,6-dimethoxyindan melting at 158°–60° C. after recrystallization from acetone is obtained.

EXAMPLE 5

1-(p-Methoxybenzyl)-5,6-Dimethoxyindan

A solution of 3.5 g. of the compound of Example 4 in glycol monomethyl ether is hydrogenated at 30–40 psi. hydrogen pressure in the presence of 0.07 g. of palladium deposited on 1.33 g. of carbon. After hydrogen uptake ceases, the solution is filtered under reduced pressure and the solvent is stripped under reduced pressure leaving an oil which crystallizes upon standing. Recrystallization of this crude material from ethanol produces pure 1-(p-methoxybenzyl)-5,6-dimethoxyindan melting at 74.5°–76.5° C.

EXAMPLE 6

1-(p-Methoxybenzyl)-5-Methoxyindan

This compound is obtained by following the procedure of Example 5 with the compound of Example 1. Recrystallization of the crude hydrogenation product from ethanol produces the pure compound melting at 67.5°–70.0° C.

EXAMPLE 7

1-(p-Hydroxybenzyl)-5,6-Dihydroxyindan

By following the procedure of Example 2 with the compound of Example 5,1-(p-hydroxybenzyl)-5,6-dihydroxyindan is obtained. However, due to the instability of the compound of this compound in an alkaline medium, no sodium hydroxide is added to the reaction mixture and it is extracted directly with ether. The pure compound melts at 162°–4° C. after recrystallization from ethanol/benzene/hexane.

EXAMPLE 8

1-(p-Hydroxybenzyl)-5-Hydroxyindan

By following the procedure of Example 2 with the compound of Example 6,1-(p-hydroxybenzyl)-5-hydroxyindan is obtained. The pure compound melts at 159°–62bL C. after recrystallization from ether/benzene.

EXAMPLE 9

1-(p-Acetoxybenzyl)-5-Acetoxyindan

Repeating the process of Example 3 with the compound described in Example 8, the desired indan melting at 64°–6° C. after recrystallization from benzene/hexane is obtained.

EXAMPLE 10

1-(p-Acetoxybenzyl)-5,6-Diacetoxyindan

Acetylation according to Example 3 is carried out with the compound of Example 7. Recrystallization of the crude material from benzene/hexane gives pure 1-(p-acetoxybenzyl)-5,6-diacetoxyindan melting at 130°–2 C.

In all of the above tabulated examples, the infrared spectra and microanalyses are in agreement with the assigned structures.

The new compounds may be administered intravenously, intramuscularly, subcutaneously, orally or in other suitable forms of applications to warm-blooded animals; in all these routes, suitable pharmaceutical carriers may be used to make pharmaceutical dosages forms such as pills, tablets, solutions, suspension and the like. The new compounds may be administered alone or in admixtures with one another or together with other pharmacologically useful drugs.

We claim:

1. A compound of the formula

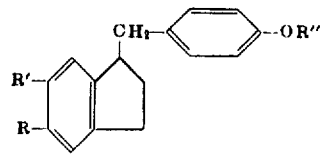

or

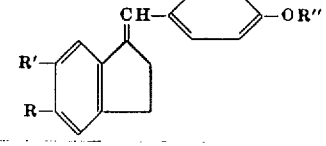

wherein R is OH, methoxy or acetoxy, R' is H or R and R" is H, methyl or acetyl.

2. The benzylidene compound of claim 1 wherein R is OH and R and R" are hydrogen.

3. The benzylidene compound of claim 1 wherein R is acetoxy, R' is H and R" is acetyl.

4. The benzyl compound of claim 1 wherein R is acetoxy, R' is H and R" is acetyl.

5. The benzyl compound of claim 1 wherein R and R' both are acetoxy and R" is acetyl.

6. The benzyl compound of claim 1 wherein R is OH and R' and R" both are H.

7. The benzyl compound of claim 1 wherein R and R' both are OH and R" is H.

* * * * *